United States Patent [19]

Kaller et al.

[11] Patent Number: 4,728,383

[45] Date of Patent: Mar. 1, 1988

[54] METHOD OF MOUNTING READY-MADE HEADLINERS INTO BODIES OF AUTOMOTIVE VEHICLES

[75] Inventors: Adolf Kaller, Baar; Wilfried Michel, Stammham; Josef Motzet, Ingolstadt, all of Fed. Rep. of Germany

[73] Assignee: Audi AG., Ingolstadt, Fed. Rep. of Germany

[21] Appl. No.: 34,761

[22] Filed: Apr. 6, 1987

Related U.S. Application Data

[60] Continuation-in-part of Ser. No. 760,151, Jul. 29, 1985, abandoned, which is a division of Ser. No. 550,597, Nov. 8, 1983, abandoned.

[51] Int. Cl.$^4$ .................... B32B 31/04; B32B 31/20; B32B 31/26
[52] U.S. Cl. .................... 156/285; 29/430; 29/526 R; 156/156; 156/228; 156/287; 156/293; 156/303.1; 296/214
[58] Field of Search .................... 29/526 R, 430, 431; 156/351–352, 358, 362–363, 285, 382, 379.6, 379.8, 423, 380.9, 553–554, 556, 566, 156, 580–581, 228, 273.7, 287, 293, 297, 299, 300.1, 306.3, 312, 538; 254/93 HP, 2 R, 2 C; 100/211; 296/214; 269/22, 47, 50, 48.1

[56] References Cited

U.S. PATENT DOCUMENTS

| | | | |
|---|---|---|---|
| 3,512,754 | 5/1970 | Cleland | 269/22 |
| 3,657,044 | 4/1972 | Singer | 156/475 |
| 3,799,504 | 3/1974 | Vaughen | 254/93 HP |
| 3,964,958 | 6/1976 | Johnston | 100/211 |
| 4,030,961 | 6/1977 | Straeten | 156/580 |
| 4,453,303 | 6/1984 | Leddet | 29/701 |

FOREIGN PATENT DOCUMENTS 0072277 2/1983 European Pat. Off. .
1755604 5/1968 Fed. Rep. of Germany .

Primary Examiner—Donald E. Czaja
Assistant Examiner—Merrell C. Cashion, Jr.
Attorney, Agent, or Firm—Karl Hormann

[57] ABSTRACT

A method of automatically mounting read-made headliners into automotive bodies consecutively moved along an assembly line by a conveyor system, by loading a headliner provided with a coating of adhesive on its upper surface onto a support at a first position of the assembly line, moving the support with the headliner thereon into a window-cut out of an automotive body, connecting the support to the moving conveyor system to prevent relative movement between the headliner and the automotive body, raising the support to move the adhesive coating on the headliner against the ceiling of the body to affect an adhesive bond therewith while at the same time moving a support member against the roof of the body to counteract the pressure of the headliner against the ceiling, removing the support and the support member, respectively, from the body at a second position of the assembly line, and returning the support to the first position.

10 Claims, 4 Drawing Figures

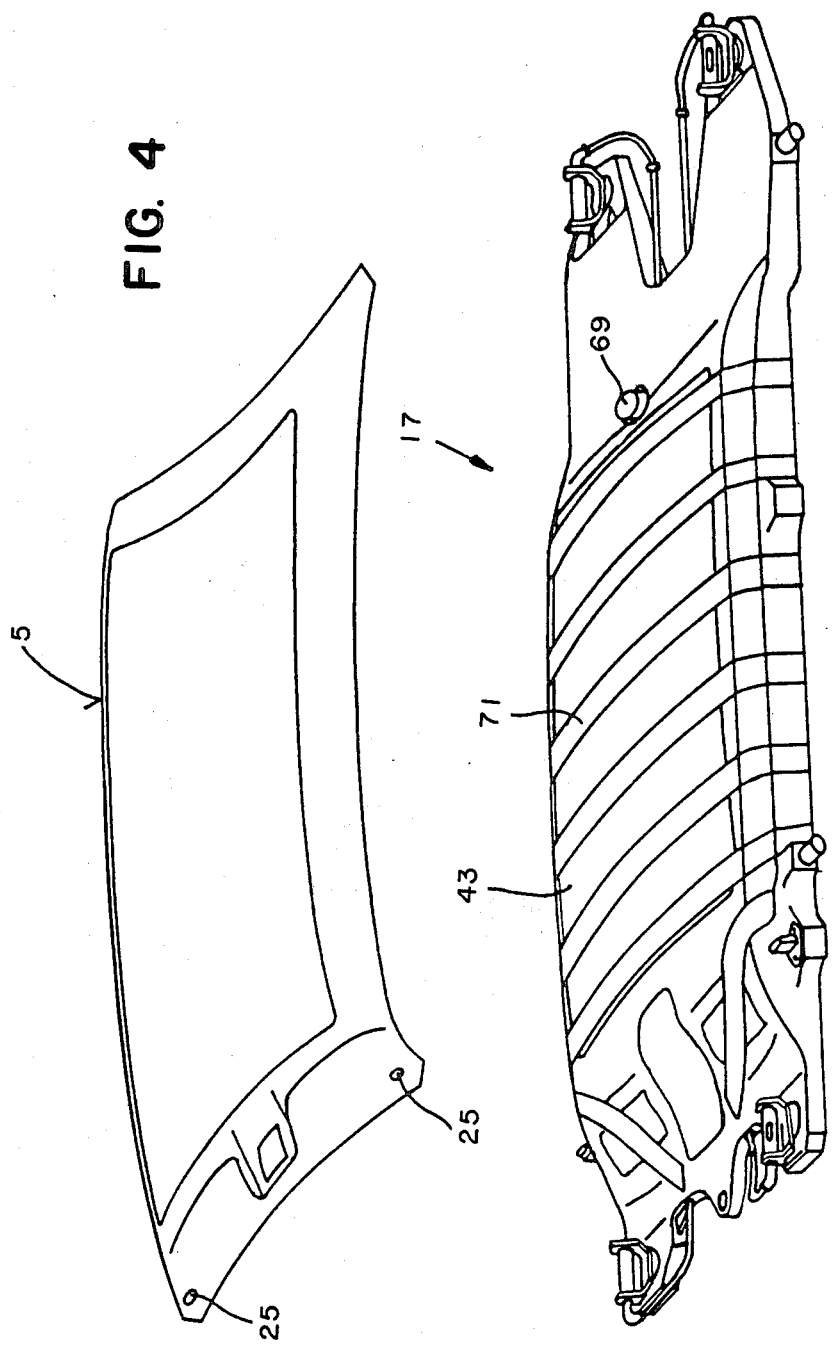

METHOD OF MOUNTING READY-MADE HEADLINERS INTO BODIES OF AUTOMOTIVE VEHICLES

REFERENCE TO RELATED APPLICATIONS

This is a continuation-in-part application of application Ser. No. 760,151 filed July 29, 1985 now abandoned which is a divisional application of application Ser. No. 550,597 filed Nov. 8, 1983, now abandoned.

BACKGROUND OF THE INVENTION

1. Field of the Invention

The present invention relates generally to automotive assembly techniques and, more particularly, to a novel method of automatically mounting ready-made headliners into automotive vehicles as an integrated phase of an assembly line operation, i.e. in synchronism with further operations, both preceding and following, performed on the assembly line.

2. Description of the Prior Art

Traditionally, headliners have been mounted to the roof of vehicle cabins by fabrics being sown, tacked, or stapled in relatively tedious methods to staves anchored to the roof of such cabins. Such method, being labor intensive, are disproportionately expensive. Since the labor is performed manually the results are not always uniform and satisfactory. Moreover, such methods have defied integration into automatic assembly line production cycles since as a rule they require assembly intervals which are unpredictable and often exceed the time slot allotted for the assembly operation and thus interfere with the intervals of other operations performed on the assembly line. Therefore, the mounting of headliners was usually performed in operations physically separated from assembly lines.

More recent assembly methods have resorted to mounting ready-made or composite headliners into vehicles by what may be termed a semi-automatic process. Such method would require a workman to utilize manually operated and controlled apparatus with a headliner placed on a mounting jig thereof which is then manually moved into the interior of an automotive body through a window cutout. The jig is provided with handles sufficiently long to permit movement of the headliner into the interior of the body such that its forward margin becomes generally aligned with a predetermined portion of the body, for instance a transom adjacent the windshield cutout. When the headliner has thus been moved into the interior of the body or compartment, the workman, by skilfully manipulating the handles, aligns a clip provided on the headliner with a recess in the transom. The clip is then placed into the recess for properly aligning the headliner relative to the ceiling of the compartment. The headliner, on its surface facing the ceiling, is coated with an adhesive layer. By pressing it against the ceiling the headliner is bonded therewith. The pressure necessary for the adhesive bonding is generated by feet connected to the jig and movable relative thereto by appropriate moving means adapted for engaging the floor of the compartment. Once a firm bond has been established between the ceiling and the headliner the feet of the jig are retracted and the jig is withdrawn from the compartment.

This method of mounting a headliner suffers from the fact that it requires a great deal of manual skill and dexterity on the part of a workman and from the fact that it is not truly adapted for integration into an assembly line operation owing to the unpredictability of the interval required for fully executing the operation. It will be appreciated that the apparatus employed in this method of the mounting is a disadvantageous in that it requires the workman to move in and out of the assembly line between consecutive automotive bodies moving therealong. There would also have to be sufficient space between the bodies to accommodate the workman, the jig with its long handles and the headliner.

Aside from subjecting the workman to considerable safety hazards the apparatus further suffers from the fact that it depends upon the vertical radial strength of the automotive bodies for the exertion of pressure adequate to bring about the bonding of the headliner to the ceiling. To provide such strength otherwise unnecessary reinforcements may have to be mounted to the bodies, particularly in the case of unitized bodies, to avoid ruptures or broken spot welds. The apparatus is at best difficult to operate, not least owing to its substantial size.

Specifically, such a jig requires considerable space in the longitudinal dimension of a vehicle body. That is to say, that part of the jig which supports the headliner must correspond in length more or less to the length of the headliner or the ceiling of the vehicle body, and, to allow the workman to manipulate the operating handles properly and accurately, they have to be about as long as the hood or the trunk of the vehicle, depending upon whether insertion of the headliner into the interior of the body is through the windshield cutout or through the rear window cutout. Given these dimensional requirements, the space required for the withdrawal of the jig subsequent to the mounting of a headliner has to be at least equal to the length of the headliner. However, for economic reasons, in a modern assembly line operation automobile bodies are spaced at intervals closer than that. Thus the method described is practiced either on a branch assembly line or in an auxiliary work station. The difficulties involved in the synchronization of movement of vehicle bodies out of and into an assembly line to accommodate the headliner mounting operation are numerous and may contribute to disruptions in the overall manufacturing process. They also, of course, have a significant adverse effect on manufacturing costs.

One problem inherent in this prior art mounting jig is that the feet for pressing the headliner against the ceiling have to be supported by the floor of the body. As alluded to above, this may result in broken spot welds or deformations of the floor, or both. In turn, such deformations may lead to deviations in tolerances which may result in misaligned headliners, particularly where the recess in the roof transom serves as the sole point of reference for aligning or orienting the headliner. Guide rollers moving along the roof supports of the body during the elevational movement of the headliner may somewhat improve the alignment operation but, in fact, they serve only to move the clip on the headliner into the recess in the transom. Since the operation of feeding and aligning the headliners is essentially a manually executed one, much time is needed for the successful execution of each mounting cycle. The problems are compounded where headliners of differing shapes are to be mounted into bodies of differing styles, for the headliner supports of the jig would have to be changed to accommodate the various headliners.

It is therefore an object of the invention to provide for a novel method of mounting headliners in a substantially fully automated manner.

A more particular object of the invention is to provide a method of mounting headliners into vehicular bodies in an operation integrated into an assembly line.

Furthermore, it is an object of the invention to provide a method of mounting headliners automatically which may be operated in synchronism with an assembly line.

Another object of the invention is to provide a headliner mounting method which avoids relative movement between a headliner and an automotive body moved along an assembly line.

Yet another object of the invention is the provision of a headliner mounting method which may be practiced within the rather restricted space available between vehicular bodies consecutively moving along a modern assembly line.

An important object of the invention is to provide a method of automatically mounting headliners of differing shapes into commensurately differently shaped vehicular bodies.

Other objects of the invention will in part be obvious and will in part appear hereinafter. The invention accordingly comprises the method and apparatus possessing the elements and combinations thereof, construction and arrangements of parts which are exemplified in the following detailed disclosure.

SUMMARY OF THE INVENTION

In a preferred manner of automatically mounting headliners into vehicular bodies the novel method is executed by the steps of placing a headliner with a coating of adhesive on an upper surface thereof onto a support and aligning it with a window cut out of a vehicle moved along an assembly line at a predetermined speed by means of a conveyor, synchronizing the speeds of the vehicle and of the support with the headliner thereon by connecting the support to the conveyor at a first position for movement thereby to a second position, inserting the support with the headliner thereon into the interior of the body through a window cut-out thereof and moving the support for pressing the adhesive coating on the headliner into engagement with the ceiling of the body at a pressure of predetermined strength while at the same time exerting a counterpressure of the same strength against the roof of the body thereby to prevent the body from being affected by stress forces, substantially simultaneously removing the support from the interior and the counterpressure from the roof of the body at the second position.

According to an advantageous embodiment of the invention the support is disconnected from the conveyor in the second position.

In a further advantageous embodiment of the invention the support is thereafter driven back to the first position.

In an especially advantageous execution of the method in accordance with the invention the support with the headliner placed thereon is moved into a forward or rear window cutout of the body in a direction substantially parallel to the direction of movement of the body.

In a further advantageous embodiment, the support may be provided with at least one inflatable pressure pad and the method further comprises the step of inflating the pad for at least partially moving the headliner into engagement with the ceiling.

In another advantageous practice of the method the counter pressure is exerted against the roof of the body by inflating at least one inflatable pad positioned adjacent the roof in superposed relationship therewith.

The method may be practiced in an advantageous manner by placing the headliner onto the support automatically.

BRIEF DESCRIPTION OF THE DRAWINGS

The novel features which are considered characteristic of the invention are set forth with particularity in the appended claims. The invention itself, however, both in its organization and method of operation, together with other objects and advantages thereof, will be best understood from the following description of a preferred method when read in connection with the accompany explanatory drawings, in which:

FIG. 4 is an exploded view of a headliner and pallet means useful for practicing the method in accordance with the invention.

Figure 1:
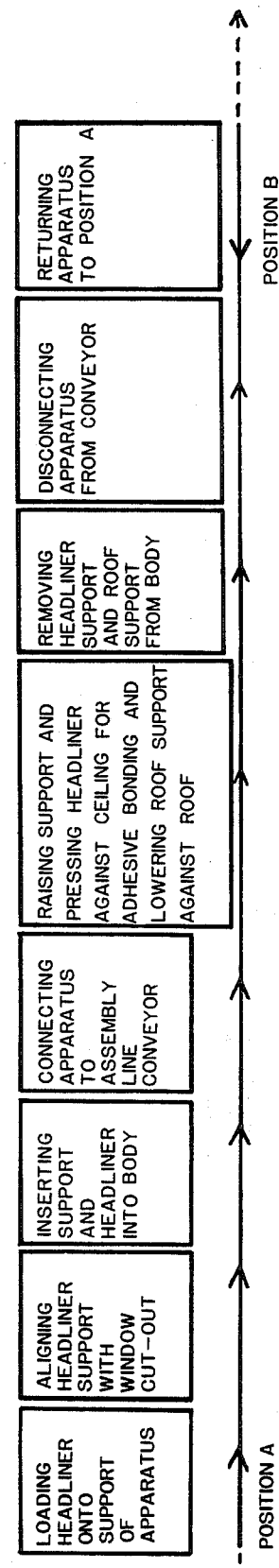
FIG. 1 is a flow diagram of the steps taken in accordance with a preferred method according to the present invention.

The flow diagram of FIG. 1 is a schematic presentation of the basic method according to the present invention. Advantageously, the method is practiced with an apparatus cooperating with an assembly line of the kind in common use in the manufacture of automotive vehicles.

A ready-made headliner is loaded onto a support at a position A of the assembly line, between two automotive bodies moving therealong at a predetermined speed, for instance at 60 m/min. Following this, the support is connected to the conveyor system of the assembly line so that it may move therewith in synchronism. This synchronous movement is of the utmost importance in that it assures that no relative movement can take place between the automotive body and the headliner during the attachment phase of the mounting operation, so that neither is subjected to any stress during this phase. In this manner otherwise possible deformations or misalignments may be substantially avoided.

The support is then aligned with respect to a window cut out, preferably the windshield or the rear window cut out. Following the alignment, the support, with the headliner thereon is moved into the interior of the body and the headliner is then moved into engagement with the ceiling of the body at a predetermined pressure, either by upward movement of the support or by inflating an inflatable pad positioned between the support and the headliner, or by both. While it would be possible to put a coating of adhesive on the sealing of the body, in a preferred method of the invention it is the headliner which will have been coated with an adhesive prior to having been placed on the support.

Substantially at the same time a support plate, preferably padded and inflatable, is moved into engagement with the roof of the body to exert thereagainst a counterpressure substantially equal in force to that of pressure with which the headliner is pressed against the ceiling. During these operations the apparatus owing to its connection to the conveyor, moves along the assembly line. When a bond of sufficient strength has been established between the headliner and the ceiling of the body the support is lowered or its pad is deflated, or both, and it is then withdrawn from the interior of the body through the window cut-out. Substantially at the same time the roof support plate is raised. Thereafter, the support is raised to a level higher than the roof of the body and the apparatus is disconnected from the conveyor at a position B and it is returned to position A where it may commence another headliner mounting cycle.

The method in accordance with the invention may be refined in several respects. For instance, sensors placed along the assembly line may detect the kind and configuration of the automotive body next to be accommodated with a headliner, and at the loading station a headliner suitable for that body may be selected for placement onto the support.

Furthermore, loading of the support may be accomplished by way of a pallet onto which a headliner has been placed, and the loading may be accompanied, or immediately preceded or followed, by ejecting a pallet emptied during the preceding mounting operation.

Preferably, the loading and unloading step may be accomplished by an endless vertical elevator connected to a subterranean headliner selection and feed system.

The method may further be refined by preparing headliners for mounting into vehicle bodies by applying adhesive coating to them, solvent-free, heat-activatable adhesives being currently preferred.

Following is a detailed description of an apparatus having been found to yield predictably satisfactory results in the practice of the method of the present invention.

Figure 2:
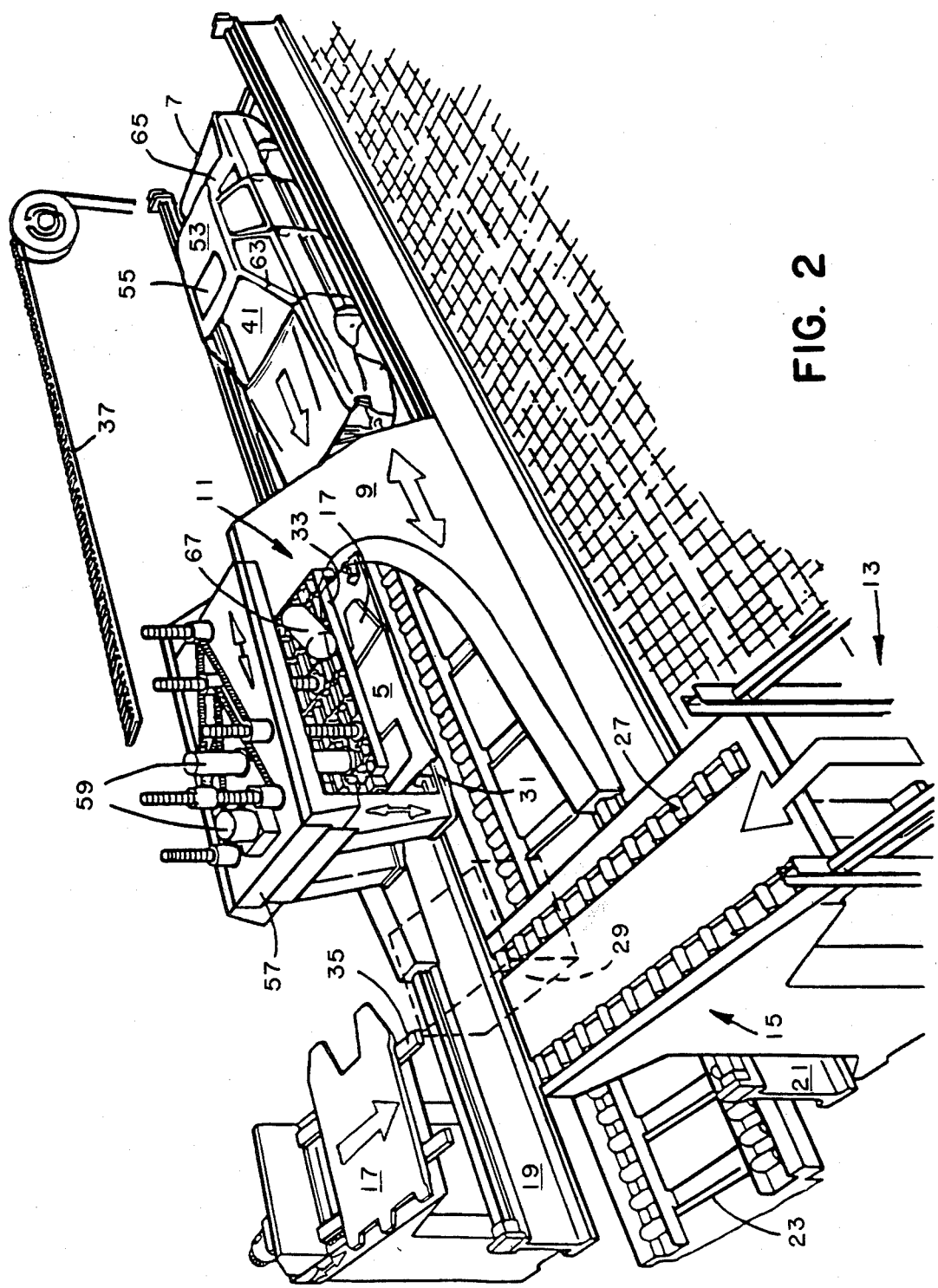
FIG. 2 is a schematic view, in perspective, of an apparatus useful in the practice of the method in accordance with the invention.

As shown in FIG. 2, the apparatus comprises a U-shaped frame member 9 the legs of which are positioned on opposite sides of an otherwise conventional conveyor 23 of an automobile assembly line along which automotive bodies 7 (only one shown for clarity) are moved consecutively at a substantially uniform speed and at regular intervals for the purpose of being assembled in a manner well known in the art.

Typically, the bodies 7 are placed on the conveyor 23 in relatively close sequence. The frame member 9 is of a size sufficient to permit the bodies 7 to pass through it, between its legs and below a jig to be described. The jig 11 is mounted to the apex of the frame member 9 and comprises a substantially C-shaped member the arms of which may be moved towards and away from each other in a manner to be described. The jig 11 is mounted for vertical movement within the frame 9 between an upper position which is high enough to permit the passage of bodies 7 through the frame 9 and a lower position which is selectively adjustable for alignment relative to window cutouts 41 of vehicular bodies 7 moving along the conveyor 23.

The frame member 9 is adapted selectively to be connected to the conveyor 23 for synchronous movement therewith from a first position shown to comprise a loading and unloading station 15 (A in FIG. 1) for headliners 5, including a vertical continuous or endless elevator system 13, to a second position (B in FIG. 1) at which mounting of a headliner 5 into the body 7 of a vehicle is substantially complete, as will be described. The side of the conveyor 23 and extending from a level below the assembly line. On the side of the conveyor 23 opposite the elevator 13 there is provided an ejector which may be connected with the elevator 13 by way of a bridging member in the manner to be described.

The legs of the frame 9 are supported by rails 19 and 21 on opposite sides of the conveyor 23 for movement therealong between the first and second positions.

A sensing station (not shown) may be provided adjacent the assembly line for generating signals representative of the type or configuration of the bodies which signals may be utilized for controlling automatic sorters of selectors which provide appropriately shaped headliners 5 in proper sequence with the bodies 7 moving along the assembly line. Also, the sensing station may direct whether doors, trunks or hoods of the bodies 7 are closed to activate appropriate controls if they are not. For instance, where a door is found to be open an indicator may sound or flash an alarm signal and/or stop the conveyor 23. Also, the height of each body 7 may be measured by sensors engaging diametrically opposite corner sections of the roof. Values representative of these measurements may subsequently be used for the automatic mounting of a headliner 5, or where the measurement indicates a body 7 improperly placed on the conveyor 23, for stopping the latter. None of these sensors and their associate controls will be described herein as they are well known and persons skilled in the art are assumed to know how to apply them to the practice of the method and function of the apparatus herein described.

The headliners 5 may be loaded onto a conveyor system of an automatic adhesive spraying apparatus (not shown) preferably provided on a floor below the assembly line. At the adhesive spraying apparatus a coating of adhesive is applied in a continous operation to that surface of the headlines 5 which is to be affixed to the roofs of vehicles.

The selection of headliners 5 suited for the bodies 7 conveyed along the assembly line is, as has been stated above, made on the basis of data gathered by sensors placed along the assembly line.

After leaving the adhesive spraying station, a headliner 5 with its adhesive coated surface facing upwardly, may be placed upon a pallet 17 (see FIG. 4). There is no pictorial presentation of this operation as it is performed by means well known in the art. The headliner 5 is aligned with the surface of the pallet 17 by means of two apertures 25 provided in forward corners of the headliner 5. The apertures may serve for mounting sun visor brackets after the headliner has been affixed to the roof of a body 7. The pallet 17 with the headliner 5 placed thereon is then moved into an upper compartment of a double-compartmented cage of the endless conveyor 13. The cage (not shown) is then lifted to eject an empty pallet from the lower compartment (also not shown). Thereafter the cage may be raised by the elevator to a level appropriate for loading into the mounting jig.

Before being loaded into the cage the load pallet 17 may be moved through a radiant heat station 29 (shown in broken lines) by means of a conveyor 27. The radiant heat station 29 may comprise a plurality of heat deflectors mounted above the pallet 17 to activate the adhesive layer of the headliner 5 at a temperature of about 80° C. (176°). In a relatively short time—about 30 seconds—the heat treatment causes evaporation of sufficient water from the layer of adhesive to provide an optimum adhesive bond in a short time after the headliner 5 has been pressed against the ceiling of the body 7 in the manner to be described. The number of heat deflectors employed is a function of the size of the headliner. Thus, headliners for station wagons may require additional deflectors which may be activated automatically, for instance, by the signals released by the sensors referred to above.

Once the adhesive has been activated, the loaded pallet 17 may be moved by the conveyor 27 to a position from where it may be transferred to the lower one of the arms of the C-shaped jig 11.

As soon as the frame member 9 and the mounting jig 11 have arrived at the first position 15, and the level of the jig 11 has been appropriately adjusted, the loaded pallet is moved onto the the lower arm 31 of the jig 11 by a well known mechanism (not shown), and an empty pallet remaining in the jig 11 from the previous mounting operation is ejected therefrom at substantially the same time. The loaded pallet 17 is properly positioned within the jig 11 by an alignment or abutment member present on the lower arm 31 of the jig 11. The alignment member is of well known construction and is neither depicted in the drawings nor described in the specification. The pallet 17 is preferably supported on the arm 31 in a floating manner, for instance by a gimbal or the like, to provide for ease of alignment of the headliner 5 relative to the ceiling of the body 7. After the pallet 17 and headliner 5 have been properly positioned on the support arm 31 the jig 11 is moved away from the conveyor 13.

As soon as the jig 11 has moved away from the loading station or conveyor 13 a bridge member 35 is moved between the insertion and ejection mechanisms to move the empty pallet 17 into the lower compartment of a cage of the elevator 13.

Figure 3:
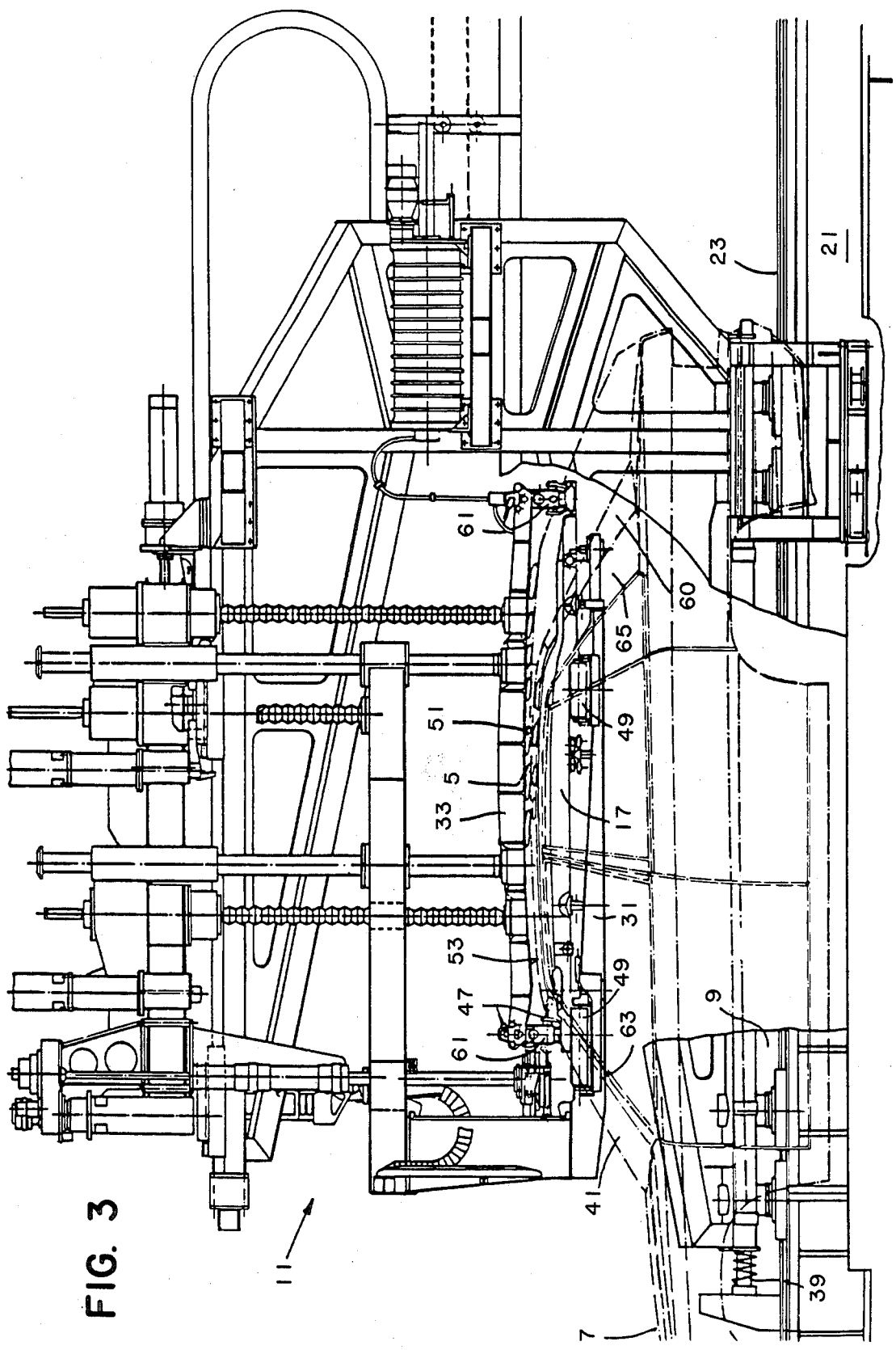
FIG. 3 is a side view, on an enlarged scale, of details of the apparatus shown in FIG. 2.

The frame member 9 and its jig 11 have been shown in FIGS. 2 and 3 in a position from which they may be moved towards the body 7 of a vehicle approaching them along the assembly line. To reduce friction the legs of the frame member 9 may be provided with roller or ball bearings for running along the rails 19 and 21. The jig 11 is mounted in the frame member 9 by means of a plurality, for instance four, ball bearing supported slides (not shown). Movement may be imparted to the frame member 9 by means of an electric motor energized by appropriately supply cables harnessed together and extending along both sides of the frame member 9 to a source of power. To improve the precision of motion required the electric motor is preferably a d.c. motor connected to the frame member by a drive shaft and toothed belts 37 (only one shown) extending along both sides of the assembly line. The frame member 9 may be moved at a linear speed of about 60 m/min. Shock absorbers 39 are provided at both ends of the rails 19 and 21 to cushion any movement of the frame member 9 beyond its intended operative range of movement between its first and second positions.

When the frame 9 has moved to a position between two consecutive automotive bodies 7 moving along the assembly line, the mounting jig 11 is lowered to a level permitting its lower arm 31 with the pallet 17 and headliner 5 thereon to be inserted into the interior of the body 7 through a windshield cutout 41 thereof. It will be appreciated by those skilled in the art that the automobile body 7 over which the frame member 9 and the jig 11 have to move to assume this position is one into which a headliner 5 has just been mounted.

Thereafter the support arm 31 with the pallet and the headliner thereon may be inserted into the automobile body 7 and clamping means (not shown) provided on the frame member 9 are activated to connect the frame member 9 to the conveyor 23 for synchronous and co-directional movement therewith to avoid relative movement between them. As stated above this is a very important feature of the invention in that it avoids relative movement between the body and the headliner during the attachment phase. The conveyor 23 may be provided with lugs (not shown) to cooperate with the clamping means.

Before describing the mounting operation of the headliner 5, the structure of the pallet 17 will be described in some detail. The pallet 17 is an important component of the mounting apparatus as it relates directly to the type or configuration of body 7 to be equipped with a headliner 5. The pallet 17 serves at least three purposes: (1) It carries or supports the headliner 5, (2) it moves into the interior of the body 7 with the headliner 5, and (3) during the attachment phase of the mounting operation it presses the headliner 5 against the ceiling of the body 7 in a controlled manner. The pallet 17 may be made of a cast aluminum alloy and as shown may be of substantially flat but somewhat convex configuration to conform to the generally concave lower surface of the headliner 5 with which it is to be used. The pallet 17 may be provided with one or more inflatable pressure pads 43 for pressing the headliner 5 against the ceiling of the vehicular body 7. A clamping bracket 45 is provided at each corner of the pallet 17 by means of which the pallet 17 may be suspended in a substantially floating manner. As well hereinafter be described, the clamping brackets 45 serve to connect the pallet 17 to a substantially flat inflatable member 33 which, as will be described, serves to support the roof of the body 7, and to inflate the pressure pad or pads 43 of the pallet 17. It is to be noted that the pallet 17 is of very simple construction for it has no control means whatsoever.

In addition to its lower support arm 31 the mounting jig 11 comprises the substantially flat roof support member 33. The flat member 33 constitutes the upper arm of the C-shaped mounting jig 11. Vertical movement of the flat upper member 33 may be provided in a well known manner by ball bearing spindles driven by d.c. motors (not shown).

To assure their proper positioning movement the upper and lower arms or members 31 and 33 may be controlled by appropriate sensors. For instance, a measuring probe 47 may be provided on the lower arm 31 and may be rendered effective when the lower arm 31 is moved through the window cut-out to determine the position of the headliner 5 longitudinally of the ceiling of the body 7 and to make adjustment as required.

An alignment system comprising two pairs of rollers 49 positioned to slide along the roof supports of the body 7 during upward vertical movement of the lower arm 31 may also be provided for the proper positioning of the headliner 5 relative to the ceiling of the body 7.

The upper member 31 may also be provided with an inflatable pressure pad 51 which may be moved into engagement with the roof 53 of the body 7 for the support thereof by providing pressure countering the pressure required to mount the headliner 5 to the ceiling. Preferably, the pressure pad 51 comprises a plurality of separately inflatable chambers arranged to provide pressure to selected portions of the roof 53. For instance, where a body 7 is to be accommodated which is provided with a cutout for a sun roof the pressure pad 51 may be provided with a separate chamber in a position corresponding to the cut-out. It will be appreciated that the pressure pad 43 of the lower arm 31 may be correspondingly configured and placed. The pressure distribution system for the lower and upper pads 43 and 51 is preferably provided in the upper unit 33, and means may be provided for automatically connecting the lower pad 43 to the upper one when the pallet 17 is placed into the jig 11.

For moving the jig 11 relative to the frame member 9 it may be suspended by a slide 57. The slide 57 and the upper and lower arms 31 and 33 are aligned with respect to each other by at least two ball bearing spindles 59. Four clamps 61 provided on the upper arm 33 may be actuated to engage the clamping brackets 45 provided at the corners of the pallet 17 to connect the pallet 17 with the upper arm 33. With the upper arm 33 and its pressure pad 51 and the pallet 17 with the headliner 5 thereon properly placed relative to the roof 53 and ceiling, respectively, the headliner 5 may be pressed against the ceiling by inflating the pressure pads 51 and 43.

The mounting operation of the headliner 5 will now be described. When the frame member 9 has moved between the two bodies 7 in the aforesaid manner the vertical position of the mounting jig 11 is adjusted and the lower arm 31 with the pallet 17 and headliner 5 thereon is inserted into the interior of the body 7 through the windshield cutout 41 thereof. Not later than when the arm 31 has been inserted into the body 7 may the frame member 9 be connected to the conveyor 23 to move synchronously therewith. The longitudinal positioning of the jig 11 relative to the body 7 is controlled in a known manner by sensors which form no part of the present invention and is accomplished by movement of the slide 57 relative to the frame member 9. The control of the vertical motion of the lower arm 31 and the headliner 5 placed thereon is augmented by the rollers 49 moving along the front and rear roof supports 63 and 65.

Once the jig 11 has been properly placed with respect to the roof of the body 7 the upper and lower arms 31 and 33 are moved towards each other until the clamps 61 engage the clamping brackets 45 of the pallet 17. The clamps 61 may be provided with pressure conduits which automatically connect with ports in the pressure pad of the pallet 17 when the clamping brackets 45 are engaged.

One or more pressure cylinders 67 may be mounted on the upper arm 33 for inflating the pressure pads 43 and 51 with a suitable pressure fluid, such as air, at a level appropriate for establishing an adhesive bond between the headliner 5 and the ceiling of the body 7 without damaging the roof. Well known means (not shown) may be provided for controlling the level of pressure in the upper and lower pressure pads. Preferably, the pressure exerted by the upper and lower pressure pads is equal but may in certain circumstances be different. In order to establish a firm adhesive bond between the headliner 5 and the ceiling the pressure should be maintained for about 20 seconds, it being understood that this interval is a function, inter alia, of the properties of the adhesive. In any event, the bond should be sufficiently strong to retain the engagement between the ceiling and the headliner when the the upper and lower arms of the jig 11 are withdrawn from their engagement with the body 7 at the time the frame member 9 has been moved to its second position along the assembly line.

Since the adhesive used in the practice of the invention is preferably a solvent free one, it is important to avoid entrapping air between the headliner and the ceiling, that pressure for mounting the headliner be initially concentrated in a central location of the headliner whence it may thereafter be spread in a radial pattern to affect the total surface area of the headliner 5. Such a pressure spreading pattern may be generated by the arrangement shown in FIG. 4 and comprising a vertically movable plunger 69 in a substantially central position of the pallet 17, and belts 71 embracing the pressure pad 43. The belts 71 may be dimensioned such that only a central portion surrounding the plunger 69 initially engages the ceiling 53 when the pressure pad 43 is inflated. Raising the pressure within the pad 43 causes engagement of the headliner 5 with the ceiling 53 in the desired radial spread pattern.

When the adhesive bond has been established the lower arm 31 is lowered, the upper arm 33 is raised, and the slide 57 is moved in the direction of movement of the conveyor 23 to remove the jig 11 from the body 7. Thereafter the frame member 9 is disconnected from the conveyor 23 and is driven to the first position which in the embodiment described is the loading position adjacent the endless conveyor 13. It will be understood by those skilled in the art that the loading station may be provided adjacent the second position of the frame member 9, instead of at the position described.

It will also be understood that the first position, including the loading station and the location at which the jig 11 is moved into and over the body, may in fact incorporate a certain increment of movement of the frame member 9 along the assembly line. For the operation of mounting headliners herein described takes place in a continuous manner, there being no interruptions in the movement of automotive bodies along the assembly except in unintended circumstances, as when a body is improperly placed on the conveyor, or when a door, trunk, or hood is open.

To insure that the jig 11 is placed into as accurate a position in the loading station as possible to receive another headliner 5 and eject its now empty pallet 17, the measuring or sensing system 47 is used to control movement of the jig 11. For given the size and weight of the apparatus its movement relative to the assembly line is at best difficult to calibrate with sufficient precision correctly to position the jig 11 relative to the loading station. Once a new pallet 17 and headliner 5 have been loaded into the jig 17, and the emptied pallet 17 has been removed therefrom, the apparatus repeats its described operational cycle to mount a headliner into the automotive body next on the conveyor 13.

The ready-made headliners found useful for practicing the method in accordance with the invention are those now well known in the art. They comprise a generally flat core member, being shaped one one side to conform to the shape of the roof of the vehicles into which they are intended to be mounted, and on the other side are usually covered by a fabric web or plastic foil. The core may be made from porous materials such as cellulose pulp or foamed plastics or the like, in manners well known in the art.

An apparatus of the kind described above may be utilized for practicing the method of automatically mounting headliners into automobiles and the like. As will be appreciated certain changes and rearrangement in the sequence of operations may be made without departing from the scope and spirit of the invention. In particular, connecting the apparatus to the conveyor may take place at any time before the headliner is moved into engagement with the ceiling, and it may thereafter be disconnected at any time after the headliner has been bonded to the ceiling and the lower support of the jig has been moved out of engagement with the headliner. Other changes may be made in respect of the components of the apparatus without either affecting the functioning of the method or otherwise departing from the spirit of the described invention and the scope of protection sought for it.

What is claimed is:

1. A method of automatically mounting ready-made headliners into automotive bodies consecutively moved by a conveyor between first and second positions along an assembly line, comprising the steps of:

placing a headliner having an upper surface provided with a coating of adhesive onto a support mounted for movement along the assembly line, inserting the support with the headliner thereon into the interior of an automotive body through a window cut-out thereof;

connecting the support to the conveyor at said first position for synchronous movement therewith;

raising the support with the headliner thereon to press the adhesive coating into bonding engagement with the ceiling of the automotive body;

substantially simultaneously with the raising of the support lowering a support member into engagement with the roof of the automotive body to counteract the pressure of the headliner against the ceiling;

moving the support member and the support out of engagement with the roof and the headliner, respectively;

withdrawing the support from the interior of the body;

disconnecting the support from the conveyor at said second position; and returning the support to the first position.

2. The method of claim 1, comprising the further step of pressing the headliner against the ceiling and the support member against the roof at substantially identical pressures.

3. The method of claim 2, comprising the further step of placing the headliner onto a pallet for loading therewith onto the support.

4. The method of claim 3, comprising the further step of ejecting an empty pallet from the support before loading the headliner thereon.

5. The method of claim 4, comprising the further step of activating the adhesive prior to loading the headliner onto the support.

6. The method of claim 5, wherein the adhesive is activated by heat treatment.

7. The method of claim 6 wherein the pallet is provided with at least one pressure inflatable pad, comprising the further step of pressing the headliner against the ceiling by inflating the pad.

8. The method of claim 7 wherein the support member is provided with at least one pressure inflatable pad, comprising the further step of inflating the pad for moving the support member against the roof of the body.

9. The method of claim 8, comprising the further step of inflating the pads of the support and the support member from a common source of pressure.

10. The method of claim 9, comprising the step of inflating the pads with air.

* * * * *